United States Patent
He et al.

(10) Patent No.: US 11,999,642 B2
(45) Date of Patent: Jun. 4, 2024

(54) METHOD FOR REMOVING CALCIUM IONS FROM HIGH CONCENTRATION ORGANIC WASTEWATER

(71) Applicant: TONGJI UNIVERSITY, Shanghai (CN)

(72) Inventors: Pinjing He, Shanghai (CN); Junjie Qiu, Shanghai (CN); Liming Shao, Shanghai (CN); Fan Lyu, Shanghai (CN); Hua Zhang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 655 days.

(21) Appl. No.: 17/264,304

(22) PCT Filed: Nov. 25, 2019

(86) PCT No.: PCT/CN2019/120745
§ 371 (c)(1),
(2) Date: Jan. 29, 2021

(87) PCT Pub. No.: WO2021/047059
PCT Pub. Date: Mar. 18, 2021

(65) Prior Publication Data
US 2022/0009808 A1    Jan. 13, 2022

(30) Foreign Application Priority Data

Sep. 10, 2019 (CN) .......................... 201910855454.X

(51) Int. Cl.
*C02F 5/02* (2023.01)
*C02F 1/52* (2023.01)
*C02F 101/10* (2006.01)

(52) U.S. Cl.
CPC .................. *C02F 5/02* (2013.01); *C02F 1/52* (2013.01); *C02F 2001/5218* (2013.01); *C02F 2101/10* (2013.01)

(58) Field of Classification Search
CPC ...... C02F 5/05; C02F 1/52; C02F 2001/5218; C02F 2101/10
(Continued)

(56) References Cited

U.S. PATENT DOCUMENTS 8,906,242 B2   12/2014   McGuire et al.

FOREIGN PATENT DOCUMENTS

| CN | 101805066 | 8/2010 |
|---|---|---|
| CN | 102485670 | 6/2012 |

(Continued)

OTHER PUBLICATIONS

Yoda et at, English machine translation JP 2005193189A, pp. 1-8 (Year: 2005).*

(Continued)

*Primary Examiner* — Claire A Norris
(74) *Attorney, Agent, or Firm* — JCIP GLOBAL INC.

(57) ABSTRACT

A method for removing calcium ions from high concentration organic wastewater is provided. The method comprises the steps of: (1) introducing high concentration organic wastewater containing $Ca^{2+}$, inorganic carbon and a seed crystal into a reactor with a molar ratio of $Ca^{2+}$ to inorganic carbon of 1:(3.2-6.2); (2) adjusting the hydrogen ion activity $\alpha(H^+)$ and ionic strength of the solution in the reactor; (3) sequentially stirring and precipitating in the reactor to convert $Ca^{2+}$ in the high concentration organic wastewater into calcium carbonate which is then precipitated for calcium removal.

6 Claims, 1 Drawing Sheet

(58) Field of Classification Search
USPC .................................... 210/702, 723, 724
See application file for complete search history.

(56) References Cited

FOREIGN PATENT DOCUMENTS

| CN | 103241910 | | | 8/2013 |
|----|-----------|---|---|--------|
| CN | 103241912 | | | 8/2013 |
| CN | 103359896 | | | 10/2013 |
| CN | 105712452 | | | 6/2016 |
| CN | 206767899 | | | 12/2017 |
| CN | 108191049 | A | * | 6/2018 |
| CN | 105668702 | | | 8/2018 |
| CN | 109293016 | | | 2/2019 |
| CN | 109354238 | | | 2/2019 |
| JP | 2531418 | B2 | * | 9/1996 |
| JP | 2005193189 | A | * | 7/2005 |

OTHER PUBLICATIONS

Kitagawa et al, English machine translation JP 2531418B2, pp. 1-4 (Year: 1996).*

Li et al, CN 108191049A, English Machine Translation, pp. 1-11 (Year: 2018).*

"International Search Report (Form PCT/ISA/210) of PCT/CN2019/120745," mailed on Jun. 3, 2020, pp. 1-5.

Yi-Pin Lin, et al., "Inhibition of Calcite Precipitation by Natural Organic Material: Kinetics, Mechanism, and Thermodynamics†," Environmental Science and Technology, vol. 39, Oct. 2005, pp. 6420-6428.

P.C.S. Pollution Control Service GMBH, "the patented product RockAway® of German P.C.S ," Available at: https://www.pcs-consult.de/en/products/rockaway.

* cited by examiner

METHOD FOR REMOVING CALCIUM IONS FROM HIGH CONCENTRATION ORGANIC WASTEWATER

CROSS-REFERENCE TO RELATED APPLICATION

This application is a 371 of international application of PCT application serial no. PCT/CN2019/120745, filed Nov. 25, 2019, which claims the priority benefit of China application no. 201910855454.X, filed on Sep. 10, 2019. The entirety of each of the above mentioned patent applications is hereby incorporated by reference herein and made a part of this specification.

TECHNICAL FIELD

The present invention relates to the field of environmental protection and comprehensive utilization of resources, in particular to a method for removing calcium ions from high concentration organic wastewater.

BACKGROUND

High concentration organic wastewater is usually treated by anaerobic digestion process. The $Ca^{2+}$ in the wastewater would crystallize with the inorganic carbon, such as $CO_2$, $HCO_3^-$, $CO_3^{2-}$ ions produced by the anaerobic digestion process, to form calcite (the most stable crystal structure of calcium carbonate). This leads to the clogging of an anaerobic reactor, which reduces the effective volume, poor removal of organic matter, and increase the inorganic fractionation of anaerobic sludge, which can block the surface of anaerobic microorganisms to reduce biological activity. It can clog the circulating pipe in the reactor (approximately once every 3 months), which results in the uncontinuous and unstable operation. Furthermore, the reactor may even need to be restarted. In addition, the blocked pipeline is usually repaired by electric cutting, but the residual methane in the anaerobic reactor can be a high safety risk. Therefore, clogging is an urgent problem that needs to be solved in the current treatment projects of high concentration organic wastewater containing calcium (such as the leachate from the storage pit of the municipal solid waste incineration plant, the black water of the paper mill, etc.).

To control the clogging in the anaerobic digestion reactor of high concentration organic wastewater, commercial scale inhibitors can be used to complex $Ca^{2+}$ to inhibit the growth of calcium carbonate crystals in the pipeline and reactor. However, the ingredients of all kinds of patented scale inhibitor at home and abroad are usually phosphorus-containing organics [Chinese invention patent, a boiler water scale inhibitor, Publication No.: CN 109293016 A], which is toxic. If it is used in the wastewater treatment industry, continuous dosing with sewage treatment (for example, the patented product RockAway® of German P.C.S (https://www.pcs-consult.de/en/products/rockaway), the dosage of 100 mg Ca/L reagent is 10 ppm), it increases the total phosphorus in the effluent. Moreover, organic matters in the inhibitor may become emerging pollutants and enter the natural water environment, which poses a huge environmental risk. In addition, the method for removing $Ca^{2+}$ before entering anaerobic digestion can also be used to reduce the total amount of $Ca^{2+}$ entering the anaerobic reactor. Thereby, the reactor fouling rate can be delayed. Currently, ion exchange is usually used for hard water softening [Chinese invention patent, chlorine-type anion exchange resin for removal of Cu, Zn, Pb, Cd in Ca-EDTA soil leaching solution, Publication No.: CN 105668702 B], that is to remove $Ca^{2+}$. However, the replacement of $Ca^{2+}$ to $H^+$ by conventional ion exchange resins will reduce the pH, which is not conducive to the subsequent anaerobic treatment. Moreover, the regeneration of the ion exchange resin will produce acid washing wastewater to increase treatment cost.

The precipitation method is a traditional method to remove various metal cations by using $OH^-$ or $S^{2-}$ for precipitation. The precipitation pH of $Ca^{2+}$ is more than 12.5, while the cost of $S^{2-}$ precipitation agent is high. Moreover, the dissolved organic matter in the sewage will inhibit the crystallization nucleation and crystal growth of calcium salt [Lin Y P, Singer P C, Aiken G R, Inhibition of Calcite Precipitation by Natural Organic Material: Kinetics. 2005. Mechanism, and Thermodynamics. Environmental Science & Technology 39(17): 6420-6428.]. Therefore, when considering to remove $Ca^{2+}$ in high concentration organic wastewater by precipitation, it is necessary to select an appropriate source of anions, and strengthen the crystal precipitation of calcium carbonate crystals under the inhibition of high concentration organics wastewater.

Patent CN 105712452 discloses a method for removing calcium ions in epichlorohydrin wastewater. Firstly, excessive carbon dioxide gas is introduced into the partially cooled raw wastewater, and then the wastewater is quickly mixed with part of the raw wastewater at the temperature above 60° C. to realize the precipitation and removal of calcium ions. However, the use of gaseous inorganic carbon source will blow off the volatile organic compound in the wastewater, increasing the demand for gas-phase pollutants; in addition, extra equipment, such as an air compressor, is required to ensure that the working pressure of dissolved air flotation is up to 0.4-1.0 MPa, thus the reactor energy consumption is large.

SUMMARY

The objective of the present invention is to provide a method for removing calcium ions from high concentration organic wastewater in order to overcome the above defects in the prior art.

This invention strengthens the formation of calcium carbonate crystals under inhibition of high concentration organic substances by introducing inorganic carbon anions into the reactor, through stirring and hydrogen ion activity $\alpha(H^+)$ regulation, thereby achieving to remove calcium ions from high concentration organic wastewater.

The purpose of the disclosure may be realized by the following technical solutions.

A method for removing calcium ions from high concentration organic wastewater, the method comprises the steps of:

(1) introducing high concentration organic wastewater containing $Ca^{2+}$, inorganic carbon and a seed crystal into a reactor with a molar ratio of $Ca^{2+}$ to inorganic carbon of 1:(3.2-6.2);

(2) adjusting the hydrogen ion activity $\alpha(H^+)$ and ionic strength of the solution in the reactor;

(3) sequentially stirring and precipitating in the reactor to convert $Ca^{2+}$ in the high concentration organic wastewater into calcium carbonate which is then precipitated for calcium removal.

Further, a COD and $Ca^{2+}$ concentration of the high concentration organic wastewater in step (1) is more than 2000 mg/L and more than 500 mg/L, respectively; for example, the leachate from the storage pit of the municipal solid waste incineration plant or a domestic waste landfill.

Further, the inorganic carbon in step (1) is a kind of liquid or soluble solid that can directly release inorganic carbon.

The inorganic carbon source comprises one or more of anaerobic digestate, sodium carbonate, potassium carbonate, sodium bicarbonate or potassium bicarbonate.

Further, the seed crystal in step (1) comprise biomass with negative potential on the surface thereof, calcite, quartz sand or anaerobic sludge, etc.; and the seed crystal as a crystallization nucleus is conducive to the conversion of $Ca^{2+}$ into calcium carbonate crystal which is then precipitated for removal.

Further, the particle size of seed crystal is 0.2 μm-2 mm.

Further, the reaction temperature of the reactor in step (1) is 10-40° C., and the hydraulic retention time is 6-32 h.

Further, the $\alpha(H^+)$ in step (2) is adjusted to $3.16\times10^{-12}$-$6.31\times10^{-9}$ mol/L by using NaOH. The present invention controls the $\alpha(H^+)$ within the above range because a too low $\alpha(H^+)$ will compete with $Ca^{2+}$ for inorganic carbon and inhibit the methane production activity of the subsequent anaerobic bioreactor; moreover, too high $\alpha(H^+)$ needs to consume a lot of NaOH, which increases the cost.

Further, the ionic strength in step (2) is 0.3-2 mol/L, thereby optimizing the activity coefficient of inorganic carbon ions and $Ca^{2+}$, and improving the supersaturation in the reactor. Wherein clean water or concentrated solution of the subsequent reverse osmosis during high concentration organic wastewater treatment can be used as the ionic strength regulator.

Further, the stirring in step (3) is at the speed of 100-600 r/min for 10-20 h.

Further, the precipitating time in step (3) is 6-12 h.

Further, the reactor in step (1) is preferably a sequential batch reactor.

Compared with the prior art, the present invention has the following advantages and beneficial effects:

1. optimizing the condition of solute solution in the reactor to increase the supersaturation of calcium carbonate; reducing the complexing ability of organic matter with $Ca^{2+}$ in the wastewater by adjusting the ionic strength and $\alpha(H^+)$, which avoids the competition between high concentration organic matter and inorganic carbon for $Ca^{2+}$; accelerating the exchange of water molecules on the crystal surface with $Ca^{2+}$ and inorganic carbon by optimizing the hydraulic condition of the flow field, which promotes the nucleation and crystal growth of calcium carbonate crystals under the inhibition of high concentration organic substances;
2. the reactor can simultaneously remove part of particulate organics and inorganics in high concentration organic wastewater, which reduces the operation load and clogging risk of subsequent wastewater treatment devices or facilities;
3. in the process of removing $Ca^{2+}$, the source of inorganic carbon is the digestate after anaerobic digestion; the dosage of agents is low. The average dosage of NaOH is as low as 0.3 kgNaOH/m³, without additional organic chemicals, thus reducing the environmental risk.

DETAILED DESCRIPTION OF EMBODIMENTS

The present invention will be described in detail below with reference to the drawings and specific examples.

Example 1

Figure 1:
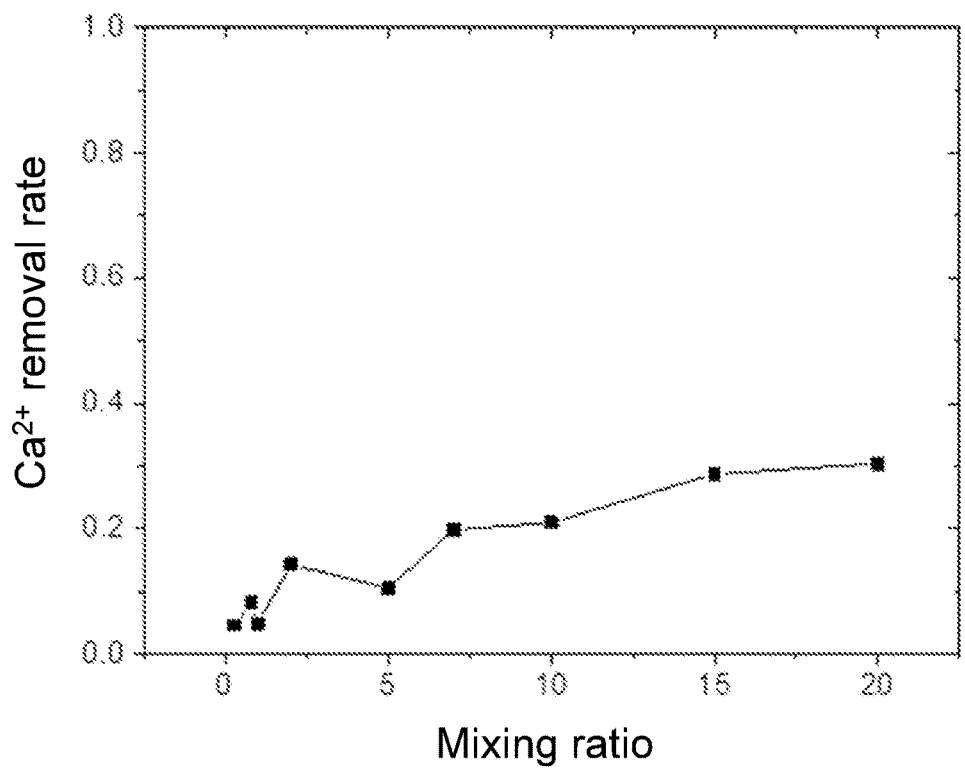
FIG. 1 shows the $Ca^{2+}$ removal rate under different anaerobic digestate/leachate ratios in Example 1.

(1) The incineration plant storage pit leachate was fed with $Ca^{2+}$ concentration of 4200 mg/L, COD of 61200 mg/L and pH of 4.12 into the sequencing batch reactor. The anaerobic digestate (with $Ca^{2+}$ concentration of 85 mg/L, COD of 2700 mg/L, and the inorganic carbon IC of 2010 mg/L) after the anaerobic treatment was used as inorganic carbon source, with a molar ratio of $Ca^{2+}$ to inorganic carbon of 1:3.2. The anaerobic digestate was precipitated for 24 h to remove anaerobic sludge. The mixing ratio of anaerobic digestate/leachate was shown in FIG. 1, and the stirring speed was 180 rpm. After 20 h, the concentration of inorganic carbon that could be used for crystallization increased as the mixing ratio of biogas slurry/leachate increased, and the removal rate of $Ca^{2+}$ increased monotonically. However, the highest removal rate was only 30% under the inhibition of high concentration organic matters.

(2) $\alpha(H^+)$ was adjusted to above $10^{-8}$ mol/L using 50% NaOH solution, and at the same time, the ionic strength in the reactor was controlled to be less than 2 mol/L.

Figure 2:
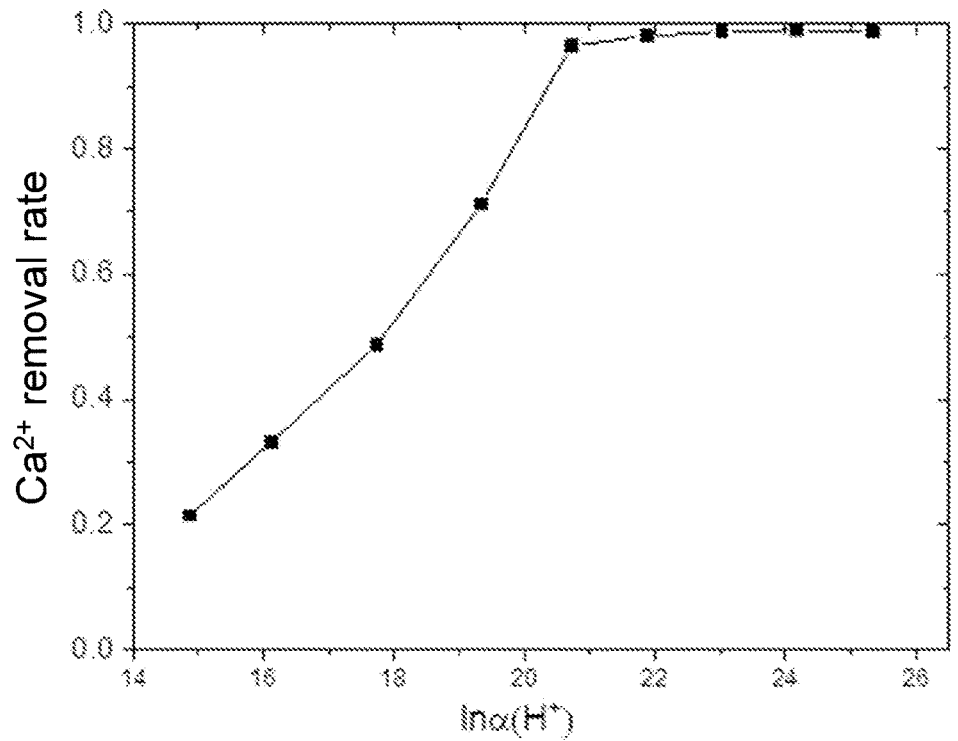
FIG. 2 shows the $Ca^{2+}$ removal rate under different initial $\alpha(H^+)$ in Example 1.

(3) The same stirring speed was 180 rpm. After 20 h, as shown in FIG. 2, the removal rate of $Ca^{2+}$ could reach up to 99%. However, if the initial $\alpha(H^+)$ of the reactor was adjusted to $3.98\times10^{-9}$ mol/L, the removal rate of $Ca^{2+}$ would be 72%.

According to this estimate, the fouling time of the anaerobic reactor for leachate treatment could be delayed by more than 3 times. Moreover, after the reactor stayed for 24 h, $\alpha(H^+)$ would be reduced to about $3.16\times10^{-8}$ mol/L along with the simultaneous fermentation process, combined with the buffer capacity of the subsequent anaerobic reactor, so that the anaerobic methanogenesis microbes could be in the optimal range, and the microbial activity could be ensured. In addition, the daily operation of the conventional anaerobic reactor required internal circulation to dilute the concentration load of the influent water and maintained a certain rising flow rate to form granular sludge. Therefore, this application example did not need to add additional pumps and energy to provide an inorganic carbon source.

Example 2

The sequencing batch reactor was the same as in Example 1. For the summer incineration plant storage pit leachate (with $Ca^{2+}$ concentration of 3700 mg/L, COD of 78300 mg/L, pH of 6.83), the molar ratio of $Ca^{2+}$ to inorganic carbon was adjusted to 1:6.2, and the intensity was 200 rpm for stirring. After 2 h, the removal rate of $Ca^{2+}$ was up to 56%.

Example 3

The sequencing batch reactor was the same as in Example 1. For the papermaking black water (with $Ca^{2+}$ concentration of 1000 mg/L, COD of 24500 mg/L, pH of 6.83), $Na_2CO_3$ was used as the inorganic carbon source, the molar ratio of $Ca^{2+}$ to inorganic carbon was adjusted to 1:6.2, the intensity was 200 rpm for stirring, and the initial $\alpha(H^+)$ of the reactor was adjusted to $3.98\times10^{-11}$ mol/L. After 20 h, the removal rate of $Ca^{2+}$ was up to 99%.

Example 4

A method for removing calcium ions from high concentration organic wastewater, the method comprises the steps of:
(1) introducing high concentration organic wastewater containing $Ca^{2+}$, such as the leachate from the storage pit of the municipal solid waste incineration plant, an inorganic carbon source (sodium bicarbonate), and a seed crystal (calcite) with a particle size of 0.2-10 μm into a reactor to keep a molar ratio of $Ca^{2+}$ to inorganic carbon of 1:3.2; and reaction at 10° C., with the hydraulic retention time of 32 h.
(2) adjusting $\alpha(H^+)$ to $6.31\times10^{-9}$ mol/L by using NaOH, with the ionic strength of 0.3-1 mol/L;
(3) stirring at 100 rpm for 20 h and precipitating for 6 h sequentially in the reactor to convert $Ca^{2+}$ in the high concentration organic wastewater into calcium carbonate which is then precipitated for calcium removal.

The invention optimized the solution and hydraulic conditions of the reactor via the reactor, which increased the supersaturation of calcium carbonate, accelerated the exchange of water molecules on the crystal surface with $Ca^{2+}$ and inorganic carbon, and promoted the nucleation and crystal growth of calcium carbonate crystals under the inhibition of high concentration organic matters, resulting in 21% $Ca^{2+}$ removal.

Example 5

A method for removing calcium ions from high concentration organic wastewater, the method comprises the steps of:
(1) introducing high concentration organic wastewater containing $Ca^{2+}$ such as municipal solid waste landfill leachate, an inorganic carbon source (sodium bicarbonate), and a seed crystal (such as quartz sand) with a particle size of 10 μm-200 mm into a reactor with a molar ratio of $Ca^{2+}$ to inorganic carbon of 1:6.2; and reacting at 40° C., with the hydraulic retention time of 6 h.
(2) adjusting $\alpha(H^+)$ to $3.16\times10^{-12}$ mol/L by using NaOH, with the ionic strength of 1-2 mol/L;
(3) stirring at 600 rpm for 10 h and precipitating for 12 h sequentially in the reactor to convert $Ca^{2+}$ in the high concentration organic wastewater into calcium carbonate which is then precipitated for calcium removal.

The invention optimized the solution and hydraulic conditions of the reactor, which increased the supersaturation of calcium carbonate, accelerated the exchange of water molecules on the crystal surface with $Ca^{2+}$ and inorganic carbon, and promoted the nucleation and crystal growth of calcium carbonate crystals under the inhibition of high concentration organic matters, resulting in 99.5% $Ca^{2+}$ removal.

The above examples are only used to illustrate the technical solution of the present invention, but not to limit the present invention. Changes, substitutions, modifications, and simplifications made by an ordinary person skilled in the art within the essential scope of the present invention are equivalent transformations, which does not depart from the purpose of the present invention, and should also belong to the protection scope of the claims of the present invention.

What is claimed is:

1. A method for removing calcium ions from high concentration organic wastewater, wherein the method comprises the steps of:
   (1) introducing inorganic carbon, a seed crystal and high concentration organic wastewater containing $Ca^{2+}$ into a reactor,
   wherein a molar ratio of $Ca^{2+}$ to inorganic carbon is 1:(3.2-6.2),
   wherein the seed crystal in step (1) is biomass with negative potential on a surface, and a particle size of the seed crystal is 0.2 μm-2 mm;
   (2) adjusting a hydrogen ion activity $\alpha(H^+)$ and ionic strength of the solution in the reactors,
   wherein the $\alpha(H^+)$ in step (2) is adjusted to $3.16\times10^{-12}$-$6.31\times10^{-9}$ mol/L, and
   the ionic strength after adjusting in step (2) is in a range of 0.3-2 mol/L;
   (3) sequentially stirring and precipitating in the reactor to convert $Ca^{2+}$ in the high concentration organic wastewater into calcium carbonate which is then precipitated for calcium removal,
   wherein the precipitating step is followed after the stirring step is stopped.

2. The method for removing calcium ions from high concentration organic wastewater according to claim 1, wherein a COD and $Ca^{2+}$ concentration of the high concentration organic wastewater in step (1) is more than 2000 mg/L and more than 500 mg/L, respectively.

3. The method for removing calcium ions from high concentration organic wastewater according to claim 1, wherein the inorganic carbon in step (1) is a kind of liquid or soluble solid that can directly release the inorganic carbon by a chemical decomposition or dissociation reaction.

4. The method for removing calcium ions from high concentration organic wastewater according to claim 1, wherein a reaction temperature of the reactor in step (1) is 10-40° C., and a hydraulic retention time is 6-32 h.

5. The method for removing calcium ions from high concentration organic wastewater according to claim 1, wherein the stirring in step (3) is at a speed of 100-600 r/min for 10-20 h.

6. The method for removing calcium ions from high concentration organic wastewater according to claim 1, wherein a precipitating time in step (3) is 6-12 h.

* * * * *